US007347815B2

(12) United States Patent
Serbanescu (10) Patent No.: US 7,347,815 B2
(45) Date of Patent: Mar. 25, 2008

(54) METHOD AND APPARATUS FOR CONVERTING SENSE-PERCEIVED THOUGHTS AND ACTIONS INTO PHYSICAL SENSORY STIMULATION

(76) Inventor: Razz Serbanescu, 624 E. 20th St., Apt. 6B, New York, NY (US) 10009

( * ) Notice: Subject to any disclaimer, the term of this patent is extended or adjusted under 35 U.S.C. 154(b) by 786 days.

(21) Appl. No.: 10/365,009

(22) Filed: Feb. 12, 2003

(65) Prior Publication Data

US 2003/0162595 A1 Aug. 28, 2003

Related U.S. Application Data

(60) Provisional application No. 60/356,261, filed on Feb. 12, 2002.

(51) Int. Cl.
*A61F 5/00* (2006.01)
(52) U.S. Cl. .................................................. 600/38
(58) Field of Classification Search ............ 600/38–41; 128/897, 898
See application file for complete search history.

(56) References Cited

U.S. PATENT DOCUMENTS

| 3,628,829 A | 12/1971 | Heilig |
| 4,771,344 A | 9/1988 | Fallacaro et al. |
| 5,398,070 A | 3/1995 | Lee |
| 5,486,141 A * | 1/1996 | Ohga et al. .................... 472/60 |
| 5,557,724 A | 9/1996 | Sampat et al. |
| 5,809,471 A * | 9/1998 | Brodsky ...................... 704/275 |
| 5,949,522 A | 9/1999 | Manne |
| 5,999,105 A | 12/1999 | Gordon |
| 6,136,277 A | 10/2000 | Nardini |
| 6,139,324 A * | 10/2000 | Roy et al. ...................... 434/55 |
| 6,152,829 A * | 11/2000 | Jaidka .......................... 472/65 |
| 6,169,595 B1 | 1/2001 | Manne |
| 6,592,516 B2 * | 7/2003 | Lee ............................. 600/38 |

* cited by examiner

*Primary Examiner*—Samuel G. Gilbert
(74) *Attorney, Agent, or Firm*—Greenberg Traurig, LLP (57) ABSTRACT

A system provides physical stimulation of the senses of a person according to a script, which may be text alone or text accompanied by audio and video content. The system includes a storage medium having at least the script stored thereon in a text format that can be interpreted electronically. A database having entries that relate at least text words indicating a physical sensation to specific sense codes. These sense codes represents stimulation of one or more physical senses related to the mechanisms on intent of the text. A media player is used for reading out signals representing the script from the storage medium in a predetermined sequential order; and system software compares the signals representing the text being read out by the player with the entries in the database, and generating at least one of the specific sense codes when there is a match. The sense codes drive a physical stimulation device where each of the sense codes causing at least one of sensations of sight, sound, feel, smell and taste in a user in proximity to the device, and in sequence with the text being read out.

22 Claims, 6 Drawing Sheets

METHOD AND APPARATUS FOR CONVERTING SENSE-PERCEIVED THOUGHTS AND ACTIONS INTO PHYSICAL SENSORY STIMULATION

This application claims the priority of U.S. Provisional Application No. 60/356,261, filed on Feb. 12, 2002 which is hereby incorporated hereby by reference in its entirety.

BACKGROUND OF THE INVENTION

The present invention relates to enhanced physical stimulation from textual material and any other type of sense-perceived content, e.g., visual, that has its foundation in thoughts, intentions, sensations and actions that can be described in text, and more particularly, to the conversion of sensory-perceived thoughts, intentions, sensations or actions into physical sensory stimulation through the automated analysis of the sense-perceived content, the generation of controlled-output based on that analysis, and the use of the output to drive a human sensory stimulation device.

People take great pleasure in reading books of various types. The words stimulate the readers' imaginations so that they have some sensation of what it would be like to be the hero or heroine of the story. If the story is a fictional account of a sunset, they can image such a sunset. If the story is about a romantic embrace, it also can be imaged. If the story is about a historical battlefield, the reader can imagine the sights and sounds. However, this stimulation is purely mental and does not involve any of the five senses of the reader.

Television has an advantage over the written word in that the scenes can be viewed and the sounds heard, thus impacting two of the senses. In the past "aroma" movies have been proposed in which smells are injected into a theater at preset times in the video presentations in order to affect the sense of smell. In some productions, seats are vibrated and liquids are sprayed on the audience to affect the sense of touch. However, apparatus involved in producing smells, vibrations, etc. have only existed on a large scale for theaters. They have not been available to the reader of a book, or even someone watching television.

Some people believe that books or text have an advantage over video presentations. In particular, a video presentation represents only the movie director's best attempt to realize his or her own interpretation of the text. It does not allow for the imagination of others in the audience. In addition, the director cannot, for technical reasons, fully realize even his vision of the words.

Thus, it would be an enhancement to the enjoyment and mental fantasy derived from reading text, if the author's intended thoughts, sensations and actions, which are imparted to the reader's imagination by the text could be directly converted into at least stimulation of the sense of touch of the reader. It would be a further enhancement if the author's intended thoughts, sensations and actions could also be projected into the senses of taste and/or smell by automated analysis of the text. It would be a still further enhancement if a video presentation that stimulates the senses of sight and hearing were augmented with synchronized stimulation of at least one of the senses of touch, taste and smell.

In addition, it would be advantageous if the user could alter the sensations intended by the author to sensations more in keeping with the imagination of the user.

SUMMARY OF THE INVENTION

The present invention is directed to enhancing the enjoyment of reading text or viewing video presentations by additionally synchronously stimulating one or more of the five senses. In order to accomplish this function, a software program monitors text that is displayed or that is embedded in the signal for a video presentation, and detects words that indicate a sensory experience. The detected words are then used to generate sensory signals that drive various sensory stimulation devices, e.g., a fan to produce a breeze, a water spray to produce the tactile sensation of rain, a flavored water spray to provide a particular taste, an odor generator to produce smells, and a vibrating instrument to produce other tactile stimulation. The codes derived by interpreting the text are called "text-based sense codes."

In addition to writing text, which can be interpreted to call for various physical stimulations, the author can also create an "action script" synchronized with the text. Such an action script contains words that can be interpreted by the system of the present invention to produce sensory stimulation. These codes are also called text-based codes, even though they originate in the words of the action script. Instead of, or in addition to the words in the action script, the author can embed "sense codes" in the action script. These embedded sense codes, which may be hidden codes, do not need to be interpreted by the system and may be directly applied to a physical stimulation device to produce certain actions by the device. These are referred to as "embedded sense codes."

An action script is useful in that it may call for stimulation even where the original text is silent about stimulation. Thus, original text, e.g., literary classic, can be augmented with an action script to produce physical stimulation in a user without changing the language of the original text.

While the user can passively enjoy the present invention, it is also contemplated that the user can change the type, duration or intensity of the stimulation specified by the author in order to create a physical stimulation which the user believes is personally more appropriate or at least different from that intended by the author.

It is also within the scope of the present invention that the physical stimulation generated by the present invention may be for therapeutic reasons instead of entertainment.

In an illustrative embodiment of the invention, text, e.g., in electronic digital form, is loaded into a device which can display it to a reader and which can also process the displayed test, generating sense codes representing the sensations intended by the author in writing the individual words of the text. As an example, the text can be loaded into a personal computer or personal digital assistant, such as a Palm Pilot. As a person reads the text, they more a cursor through the text and at the same time they use their imagination to visualize the scenes or actions described in the text. The cursor can be moved letter-by-letter, word-by-word or line-by-line. In any event, as the cursor moves through the text, the computer system encounters certain sensory perception words, e.g., breeze. These words and their synonyms, e.g., wind, are mapped to a sensory signal, which drives a device capable of producing a physical approximation of the sensory experience indicated by the word. The device may be internal to the analysis computer, e.g., a Palm Pilot, or it may be in an external structure or box, which can be located on the monitor of the personal computer and which contains several physical stimulation devices, e.g., a fan, a perfume atomizer, a mist generator and a vibratory instrument.

If the text states that a person is "feeling a gentle breeze on his face," the software detects the word "breeze" and converts it into a signal that turns on the fan for a brief period of time to enhance the sensory experience of reading the text. If the text states that the person in the story could "smell her perfume," the atomizer would be operated to produce a perfume smell. An instrument capable of vibration could be connected to the chair of the user and produce the experience of a bumpy road in response to the statement in the text that they "drove over a bumpy road."

If the sensory device is capable of producing sensory stimulation in various magnitudes and for various durations, in addition to detecting the sensory words, such as breeze, perfume, bumpy, etc., the software can analyze the sentence to determine the modifier for these words, e.g., gentle, and set the intensity and/or duration thereof. In the example above, the software also detects "gentle" along with "breeze" and interprets it to set the force of the fan at a low level.

To a certain extent, this software is similar to that in advanced word processors and translation programs. However, such programs are intended to produce additional or converted text, while the present invention is directed to converting the author's intended thoughts, sensations and actions into physical stimulation for the reader and/or viewer.

Authors can work with this new medium and embed sense codes in the action script, which can directly drive the sensory stimulation device. As a result, the sensor stimulation will be more accurate. The embedded sense codes can be used in parallel with the viewing of a video/audio presentation in order to deliver a more precise representation of the author's intended thoughts, sensations and actions depicted in the video content.

While the text and action script, perhaps with embedded codes, can be typed or directly loaded into a personal computer or personal digital assistant, it is also possible for the text and/or embedded codes to be provided from a remote source over a wireless network or over the Internet. This text and any key words in the action script can be interpreted by software according to the present invention to form text-based sense code, while embedded sense codes in the action script can be used to directly drive the sensory device. In both a stand alone version and a remote version, one particular embodiment involves experiencing sexually explicit material. In particular, sexually explicit words can be used to drive sexual devices, such as penis-shaped vibrators and mechanical vaginas, in synchronism with a sexual story.

At the foundation of the present invention is the unique process of transcribing the thoughts, sensory feelings and actions of a character created by an author into correlated behavior by a physical sensory stimulation device so that the reader or viewer has an enhanced fantasy experience. The process for converting written text into action by the stimulation device enables the present invention to be achieved. The written text or the words of an action script maybe interpreted themselves, or the action script may include embedded sense codes intended to represent the character's thoughts, sensory feelings and actions. The interpreted text-bases sense codes and/or the embedded sense codes of the action script are mapped into specific action by the physical stimulation device.

In order to accomplish the functionality need for the present invention, a special purpose software module monitors text that is displayed for the user in order to locate text-based sense codes, or embedded sense codes that are delivered through an action script stored on an "action card" accompanying a video presentation. Both types of sense codes are converted into signals driving the stimulation device.

Action cards may also be used to modify the relationship between certain words or embedded sense codes, and the physical action to be produced by the physical stimulation device. This alteration may be used to improve the fantasy for the user or to make the stimulation closer to personal experience of the user. It may also be used to take advantage of new developments in physical stimulation devices.

The sense codes can be utilized in a converter device, which can be distinct from or integrated into the sensory stimulation device, to generate electrical signals suitable for driving the elements of the physical stimulation device. The converter device can also be part of the computer system that interprets the text. A separate device can be used in various versions of the invention, including stand alone, game and networked versions.

BRIEF DESCRIPTION OF THE DRAWINGS

The foregoing and other features of the present invention will be more readily apparent from the following detailed description and drawings of illustrative embodiments of the invention in which.

DESCRIPTION OF ILLUSTRATIVE
EXEMPLARY EMBODIMENTS

A sensation or action can be expressed through a set of one or more written words. However, the written word is just one way to express these sensations or actions. Another way is through video-with audio and/or audio alone (someone telling a story, music). However, even in the case of audio or video, the written word will typically precede the audio or video content.

The method and apparatus according to the present invention map the written words, which describe a specific thought, sensation or action, into text-based sense codes. They also detect additional embedded sense codes, which directly call for sensory stimulation. These sense codes are converted into signals that drive a sensory stimulation device to create specific sensory experiences. These same codes can be synchronized and made compatible with the action explicitly and/or implicitly portrayed by an audio/video presentation.

The codes, which result from the processing of digital text and action scripts, can be used to drive the behavior of a tangible physical stimulation device of a sexual nature, as well as devices that provide therapeutic treatment of the users.

According to the invention, written text in digital form is processed and analyzed to generate "text-based sense codes". The text-based sense codes are then interpreted and used to drive the behavior of a tangible physical device. In addition, an action script, separate from the text, can be created. This script has key words, which can be interpreted to produce certain actions by the physical stimulation device. The action script can further have embedded sense codes that can be directly read by the physical stimulation device without the need for interpretation. Thus, the action script is a timed sequence of key words and/or embedded sense codes that have been written to correspond with or be integrated with the text or some audio-video content. These embedded sense codes of the action script can subsequently be detected like the text-based sense codes from the original and used to drive the behavior of the physical stimulation device in conjunction with the display of the audio-video content.

As a further alternative, an action script for audio-video content can be associated with the audio-video content with the intent of having the words of the script processed and analyzed automatically to generate text-based sense codes in parallel with the display of the audio-video content. As a result, the text-based sense codes can be interpreted and used to drive the behavior of a physical stimulation device.

In a still further alternative, an action script file with only embedded sense codes can be delivered directly to a converter device for interpretation and direct drive of a physical stimulation device. As an alternative, the embedded code action script can be stored, e.g., with the video content, for later use or display through an action storage card, with the intent of having the sense codes interpreted and used to directly drive the behavior of a physical sensory stimulation device in parallel with the audio-video display.

The interpretation of words and codes may be carried out by software running in a computer or a separate device. The output will be the sense codes for driving the physical stimulation device. However, the sense codes may need to be converted to electrical signals in order to drive the physical stimulation device. The action script can be stored in an action card, i.e., a storage media such as a SmartMedia card. The action card may be plugged into the computer or the separate device, which plays the text or video, so that this script effects the codes output by the device.

In the adult entertainment area, the physical device can be used by a male or female for sexual stimulation. The device, e.g., a vibrator or mechanical vagina, is designed and intended to stimulate the obvious sexual organs in harmony with the image created by the mind as a result of reading text, listening to audio or viewing audio-video content.

The process of the present invention can form the central component of a therapeutic procedure intended to treat certain psychological problems, e.g., female sexual dysfunction, female sexual dissatisfaction, male erectile dysfunction or male impotence. In particular, a physician or psychologist devises certain therapeutic text in order to treat the condition. The text, perhaps with embedded sense codes, is played for the patient. The text is designed to stimulate the patent in a way to overcome the problem by causing the patent to create a mental fantasy based on the reading of the text (or viewing the video) while at the same time enabling the patient to experience physical stimulation based on the text and in synchronism with the fantasy created as a result of reading the text.

The present invention can also be used for remote physical therapy. The physical device, e.g., a special purpose chiropractic vest for resolving back-problems, can be activated by a signal from a remote wireless unit that has interpreted the action codes.

Figure 1:
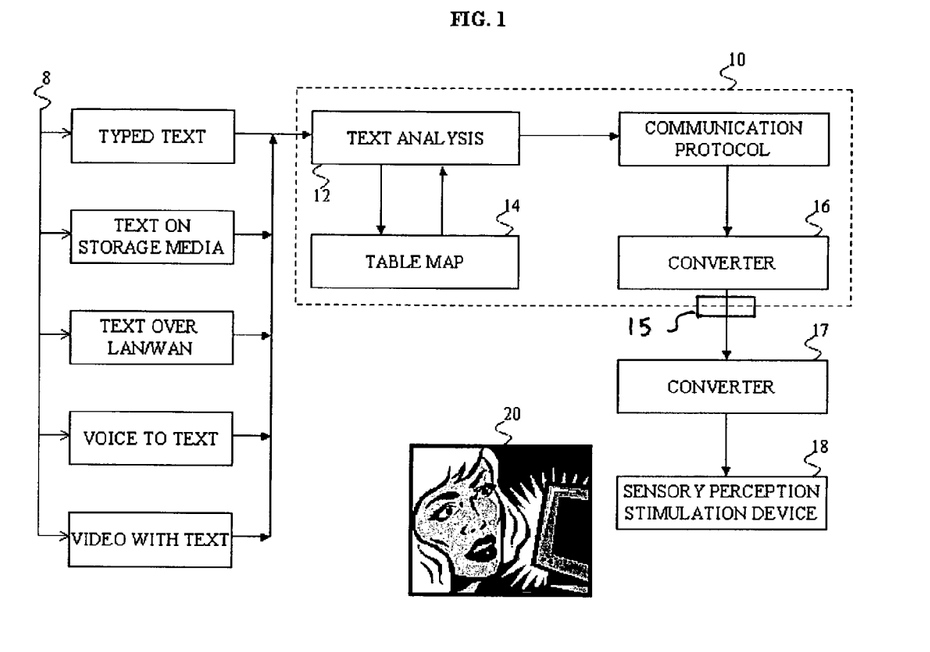
FIG. 1 is a block diagram of the apparatus for carrying out an illustrative embodiment of the invention.

As shown in FIG. 1, the present invention will process input text 8. This text may be on a storage media, e.g., a CD ROM, or it may be provided remotely over a wireless network or a wired network, such as a LAN, WAN or the Internet. The text is input to a digital device where it can be read, e.g., a personal digital assistant (PDA) or a personal computer (PC) 10 as shown in FIG. 1. The software 12 in the PC executes an algorithm that will analyze the text, locating key words that indicate actions or sensory stimulation within the story. These key words are used to look up text-based sense codes in a table map 14 based on the words and punctuation making up the phrases, paragraphs, and pages.

At specific text intervals (based on text, time, or punctuation) text input is processed/analyzed according to a set of predefined rules that work in conjunction with information stored in a database in the form of table map 14. The database can be adapted to various languages and can be improved or changed independently from the code generation algorithms. This database can be installed (depending on how it is decided to expose the data to the user) on the user's computer along with the system software. It can also be made available over the Internet, or a LAN or WAN. Specific and unique text-based sense codes are mapped to these unique permutations of one or more words and/or text stored in the database.

When there is a match between the text input and the text stored in the database or table map 14, one or more sense codes (possibly transformed to electrical signals or magnetic waves by converter hardware or software 16), are sent to the output port 15, which may be a Parallel port, USB port or the Infrared port of the PC 10. A sensory stimulator 18, for example a physical stimulation device, is connected to receive this signal over a cable connected to the port 15 (if it is not an infrared compliant device), or wirelessly if it is an infrared device. The input to the physical stimulation device 18 may first be processed through an additional converter 17. The converters 16 and 17 can be constructed as one unit, and may be constructed as one unit with the physical stimulation device 18. For clarity of purpose in this discussion, reference will made to a single converter 17.

The physical sensory stimulation device is provided with specific attributes, i.e., attributes unique to that device only. It must be designed to handle at least one sense code/signal and it may be designed to handle as many as all of the sense codes that are defined up to the date when the physical device is created. The physical device will react in a manner that can be sensed by at least one or more of the five human senses of perception of the user 20 of the system.

Figure 2:
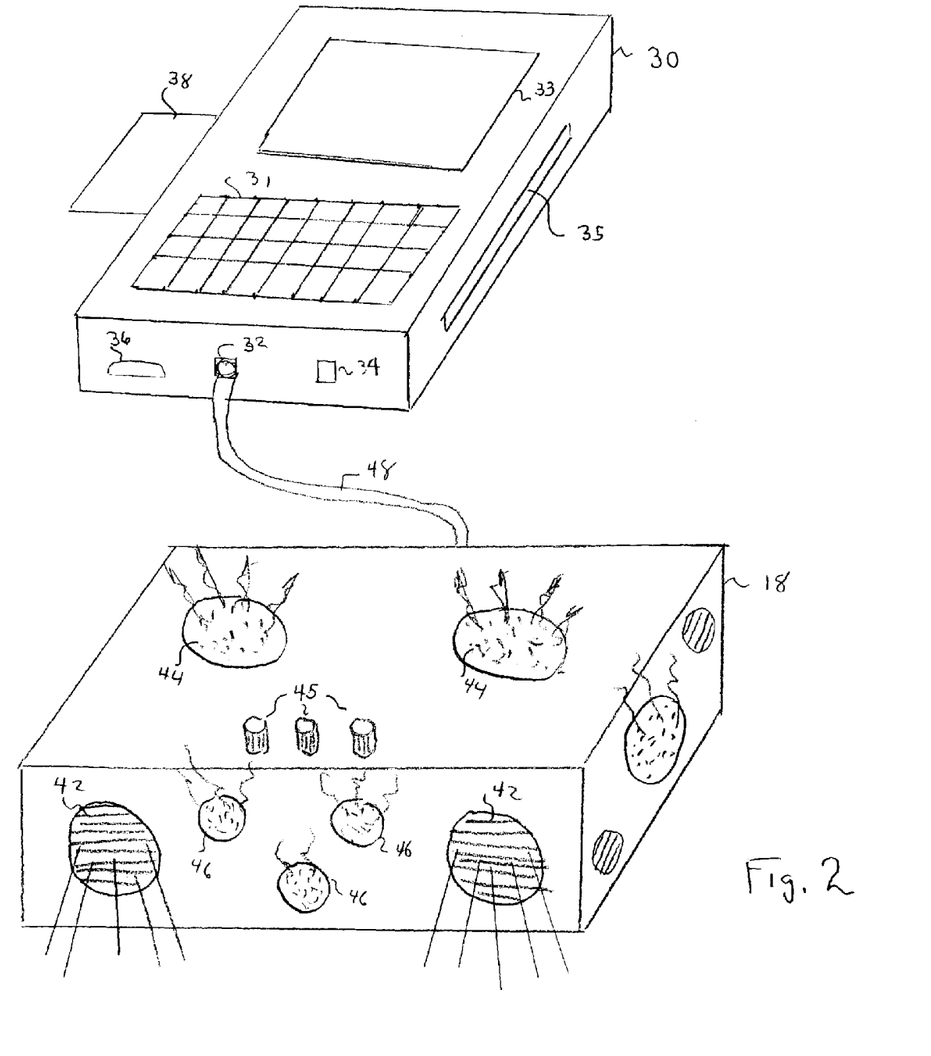
FIG. 2 is a perspective cut away view of a physical stimulation device according to the present invention.

In carrying out the invention, a part of the personal computer. 10 or a separate especially designed system unit 30, as shown in FIG. 2, is used. System unit 30 includes the logic for the system, as well as USB output port 32, infrared output port 34 and parallel interface port 36. The unit 30 interprets digital text to locate specific words or groups of words that indicate some sensation the viewer or user is to experience. In response, it generates signals that can be applied to physical stimulation device 18 of FIG. 2 to create the desired physical stimulation.

Text may be entered in unit 30 through keyboard 31 or media reader/writer slot 35, e.g. a R/W CD or DVD drive or a floppy drive These drives can input not only text media, but also audio and video media. The text and any video media may be displayed to the user on display 33. The text and video may be in separate windows on the display or the text may appear as a transparent overlay to the video.

The system unit 30 may also includes a slot for action cards 38 (such as SmartMedia), which contains sense codes and a database of related words or groups of words. Some of the functionality that can be implemented through the use of an action card 38 enables the user to supply or modify the contents and/or configuration of the mapping table 14 used by the processing software. This allows use of the same system unit 30 and its software with different types of sensory stimulation devices (e.g., as designed for different uses, such as adult entertainment, chiropractic therapy, etc.). Additional functionality achieved with the action card allows for the delivery of action scripts. For example, a DVD movie may be sold with an accompanying action card. The action card will deliver an action script that will drive the behavior of a sensory stimulation device in harmony with the content delivered by the playing of the DVD.

Power can be supplied to this device over a conventional power cable, or it may be battery operated.

The physical stimulation device 18 is also shown in FIG. 2. It includes fans 42 that produce a wind output. One or more scent outputs 46 can be used for injecting scents into the environment adjacent to the device 18. Each may produce a different relevant order. The unit 18 may also include liquid spray outputs 44 that can give the sensation of rain. These outputs can be individually operated, or can be combined, in response to the receipt of sense codes or signals related thereto.

The input to the unit 18 can be over cable 48 or by way of an infrared or other wireless signal. Depending on the sense code received, the intensity of the wind, scent or spray can be adjusted. Also, manual adjustment knobs 45 are provided on the top surface of the device to give the user some control over the intensity of the stimulation.

An author creating text for the system or action scripts will experiment with different combination of device on the unit 18 to assure that the desired result is achieved. For example, if a particular flower scent is desired, the author would purchase different flower scent-extracts and load the cartridges in the device 18. Next, the author would decide what combinations give the desired result, and would indicate the sense code that produces that result. Alternatively, the author would type text into the device 18 which would be interpreted in the same way. As an example, the author could type: "I would like to experience a light fragrance of wild Japanese roses combined with a strong fragrance of Daisies, on a breezy afternoon in August, while walking against the breeze on the beach." The invention-specific software is trained, e.g., through an action card, to recognize the words, which produce the sense codes that result in the desired combination of scents. In this case, different scents will be combined in the desired proportions and released, while the built-in fans will simulate the wind factor.

The physical stimulation device 18 is a tangible device used to stimulate the senses of the user in harmony with the image created by the mind as a result of reading text, listening to audio or viewing video/audio content. When creating a physical device, it is up to the designer to decide the physical characteristics of the physical device. It is also up to the designer of the physical device to decide what part of the human body to stimulate.

The physical device 18 must be designed to handle at least one converter signal or sense code and it may be designed to handle as many as all of the converter signals or sense codes that are defined by and implemented by the converter up to the date when the converter was created, It is preferable if all such physical devices be designed and implemented according to the following guidelines:

The physical device should react in a manner that will stimulate one or more of the five human senses of perception.

The physical device should be driven by a signal from the converter to which it is connected, e.g., a signal from the output port of a computer running the system of the present invention or a special unit 30.

When designing a physical device, the designer is free to decide how many sense codes or signals it will be able to handle and which ones it will handle.

Upon implementing the handling of a sense code, the designer will be aware (through agreement and approval) of the text word or words that this sense code or signal will be associated with a particular action of the device 18, and therefore what implied intention or sensation will be associated with a certain word or words.

The designer of the software system and physical stimulation device must coordinate how the behavior described by the words in the database will correspond to the sense codes.

The logic implemented in the software system and the physical stimulation device must be in harmony with the implied intention perceived from the meaning of these words to which the sense codes are mapped.

Safety should be a priority when implementing logic in the physical stimulation device and designing its physical behavior, in order to avoid injury to the user.

Figure 3A:
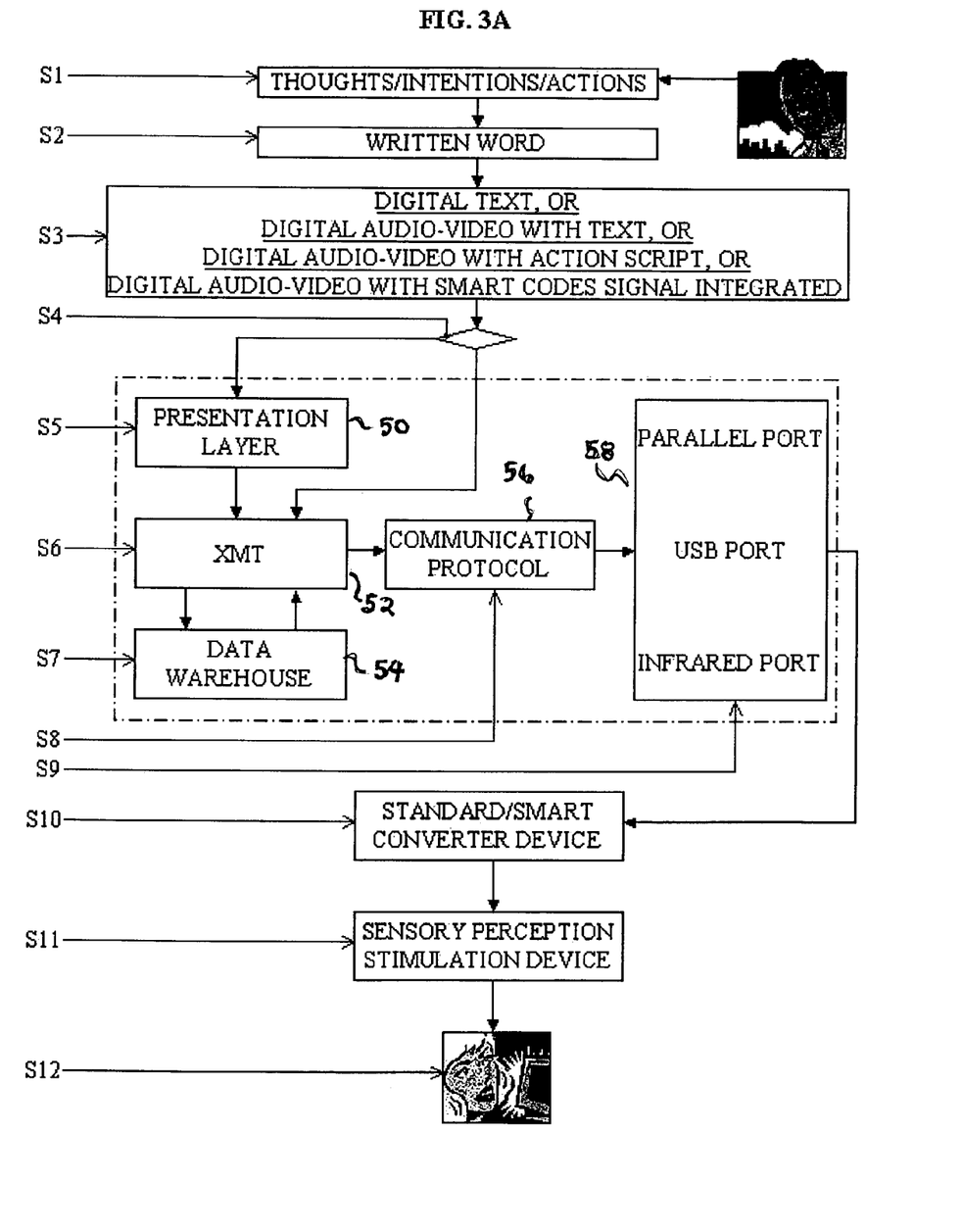
FIGS. 3A & 3B are flow charts of the process for carrying out the present invention.
Figure 3B:
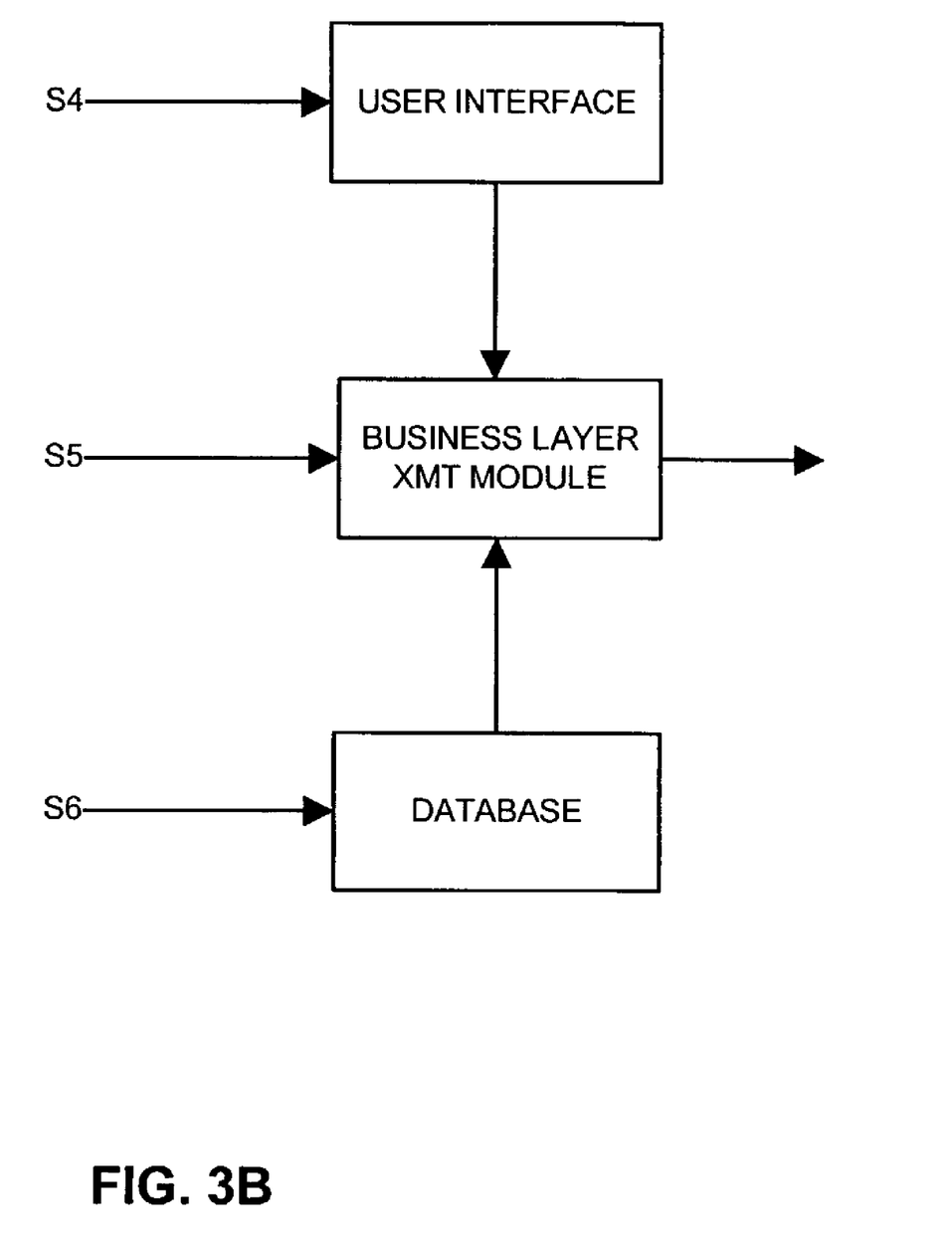

FIGS. 3A and 3B show the process of the present invention. In step S1, an author contemplates thoughts, intentions, sensations, actions, etc. as part of a narrative or script, and stores them in tangible form as written words (step S2). In step S3, the text may be converted into an electronic digital form. Further, the digital text may be augmented with audio and/or video synchronized with the script to add sight and sound to the script, thus allowing two of the senses to be stimulated.

Further, in step S3 an action script may be synchronized with the audio, video and/or text, all three of which may be embodied on various storage media, e.g., a video tape, CD ROM or DVD. The action script indicates certain sensations to be experienced by the reader. Such actions scripts may be plain words, which the converter can interpret. The author may also integrate sense codes into or along with the plain words in the action script. Such sense codes may be directly applied to a stimulation device and cause it to operate without the necessity of interpretation by the computer 10 or system unit 30.

The combination of the digital text, audio, video, action script with or without embedded sense codes, can be accomplished on a suitably programmed personal computer 10 or separate system unit 30 in ways known to those of ordinary skill in the art such that they are related to each other. The computer or unit may be the same one on which the text is interpreted or a separate one, perhaps at a remote location. For example, if the text indicates a person is by a brook, a still photograph or a video may be synchronized so that it is displayed, e.g., on the monitor of the computer or the display 33 of unit 30, when that part of the text is reached. The sound of a brook may also be initiated at that point in the text. If the author intends that the smell of wild flowers is to be experienced by the brook, the author can alternatively include that description in the text, put such words in an action script, or included a sense code that causes the physical stimulation device 18 to emit the odor of wild flowers.

The composite material at this point would, e.g., be stored temporarily in dynamic memory of the computer or unit 30. The p.c. or unit could be used to interpret and convert the text or other signals into drive signals that are then used to drive immediately the physical stimulation device 18. Instead, the composite material could be stored on the p.c.

or unit hard drive or burned onto a CD ROM or DVD for later use, e.g., in drive 35 of unit 30.

As shown in FIG. 3A, the software for playing the composite material may be arranged as an application with a user interface or presentation level 50, a database or data warehouse 58 of key words, i.e., the table map 14 of FIG. 1, and a business level application 52 between them. See FIG. 3B. As shown in FIG. 3A, the business level will have an XMT module for communications using a protocol 56. Outputs of the software may be through ports 58 (Parallel, USB or IR). In this tiered structure, data is input to the business level software 52 by the presentation layer 50, and it works with data in the data level 54 to produce a useful output result.

As an example with the present invention, when the composite material is to be played, it is presented to application software in the p.c., Palm Pilot or specialized unit 30. The first thing this software does is to determine in step S4, what type of input is being received. If the input is text, the text is sent to the user interface or presentation programming layer 50 (step S5). This text file can be a regular story or any combination of works, some of which match key words in the database, which will generate sense codes. In particular, key words in the text are compared in step S5 to a list of words in the database 54(steps S6 and S7). Where there is a match, sense codes are generated and make up a sense code file which is transmitted via a communications protocol 56 (step S8) to an output port 58 of the computer (step S9), e.g., the Parallel port or the USB port. The sense codes from the output port may be sent to the converter 17, which generates sense signals (step S10) that drive the physical stimulation device 18 (step S11). The physical stimulation device 18 then affects the senses of the user 20 (step S12).

If the composite material has an action script with embedded sense codes, they are applied directly to the business layer, which integrates them with the text-based sense codes without having to make comparisons with the key words stored in the database 54. In effect, the embedded sense codes are passed through the business layer 52 directly to the converter device 17, without alteration.

The composite material may also include audio and video information. In particular, digital video content may be accompanied by a time delimited sense code file. The user may view the audio/video content while at the same time viewing the text that displays in parallel with the audio/video content, and while the sense codes drive the physical device 18 to further stimulate the user. As an alternative, the user may choose to turn off the text display or the video display.

The user can customize the business layer software and the presentation layer, e.g., through a keyboard 31 or action card 38 connected to the user interface (FIG. 2) so that the system responds to the user's preferences. For example, the user can chose when, how and at what intervals text is processed or analyzed. Therefore, the thoughts, sensations and actions intended by the author are interpreted in a way the user selects. The user can also customize the system to produce a particular response when a certain key word is detected. Thus, different users can program the receipt of different stimuli or different intensities or durations of stimuli in response to the same text.

Figure 4A:
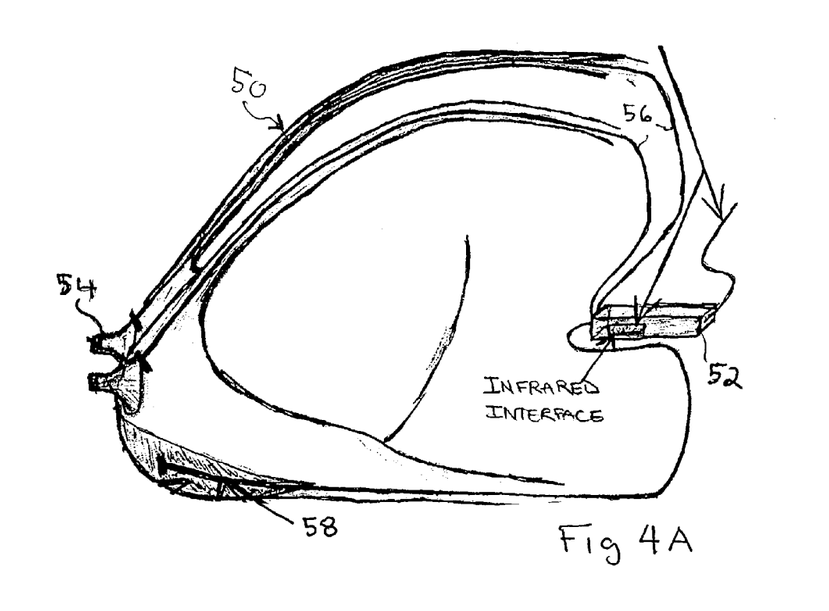
FIGS. 4A & 4C are views of sensor devices for sexually stimulating a women in accordance with the present invention.
Figure 4B:
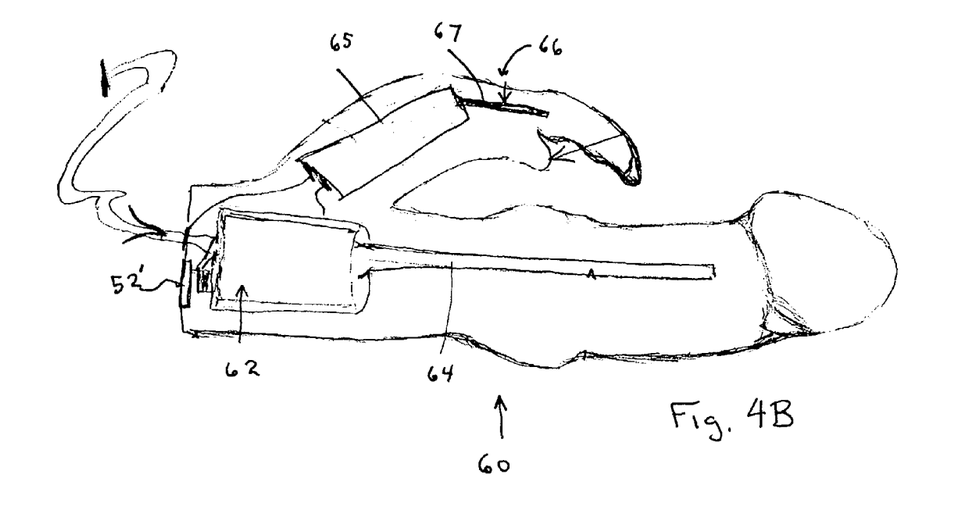
FIG. 4B is an illustration of a female sexual dysfunction and dissatisfaction therapeutic device.
Figure 4C:
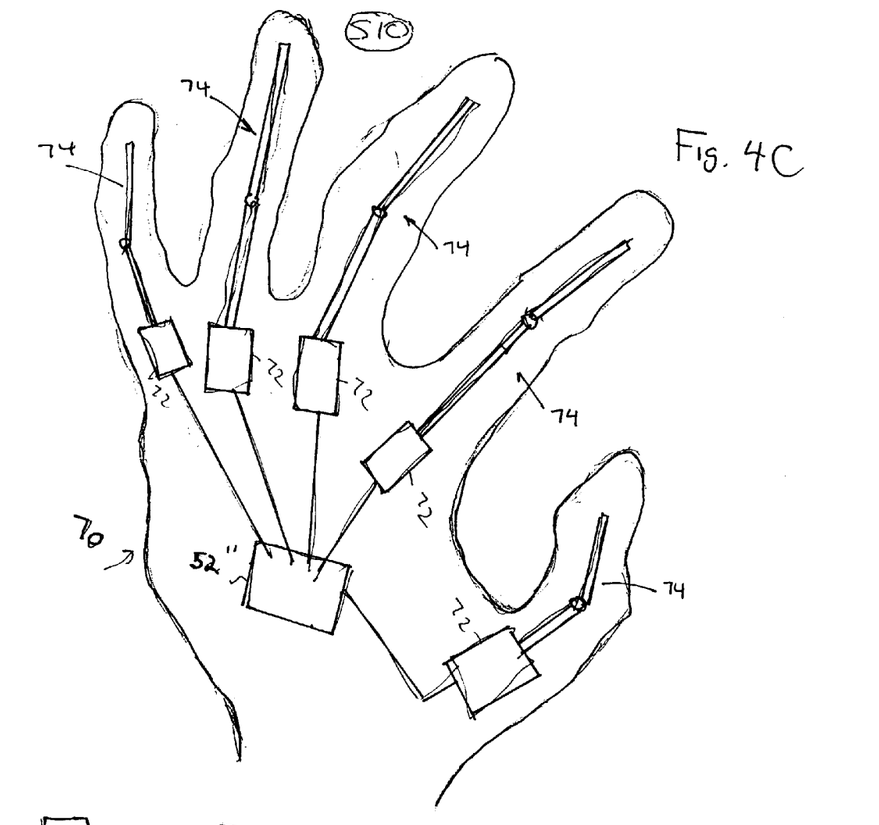

While one type of physical device 18 is shown in FIG. 2, other types of a more sexual nature are shown in FIGS. 4A-4C. In particular, FIG. 4A is a breast stimulator in the form of a vibrating bra 50. It includes an infrared or r.f. (i.e., wireless) receiver 52 in order to allow the device to receive signals from the converter 17, while still allowing the wearer to be mobile. The receiver is, e.g., equipped with a battery that powers the receiver and also drives nipple vibrators 54, which may have linear or circular motion. Wires 56 connect these vibrators with the receiver. Similar wires also connect the receiver to under breast vibrating pads 58, which may vibrate or provide contractions due to air pressure applied to the pad from a pump (not shown). According to the sense code, one or more of the vibrators 54, 58 may be activated at any one time. The device 50 may be designed to have either a set number of distinct behaviors or a discrete flow of behaviors or a combination of both, depending on the input from the converter.

A woman may use this device 50 as part of a female sexual dysfunction/dissatisfaction therapy package which includes audio/video content and is intended to help a woman overcome problems preventing the achievement of sexual orgasm. In the *American Family Physician—Basic Treatment Strategies for Female Sexual Dysfunction* it indicates that this disorder can be over come if the woman is encouraged to use erotic materials (videos, books) and to masturbate to maximize familiarity with pleasurable sensations; encourage communication during sexual activity. It also recommends the use of vibrators. Further, similar prescriptions can be found in *Sexual Function*, Health Council of the American Foundation for Urologic Disease.

The device 50 interfaces with the computer 10 or system unit 30 whose operation may be modified by use of an action card 38. While the woman is reading content intended to stimulate her arousal and develop her imagination, the computer 10 or system unit 30 is delivering sense codes to vibrating bra 50 to control its behavior. Some of the functionality achieved by the breast stimulator 50 includes, but is not limited to. vibrating the nipples, vibrating the under breast area and massaging the breast by air-pressure contractions.

FIG. 4B is a vibrating penis device 60 equipped with a receiver 52' for receiving signals from the converter 17. Receiver 52 may be wired to the converter 17, or it may be a wireless receiver. In either case, the device 60 has a motor 62 attached to a rod 64, which together are capable of causing the device to move in circular, up and down, as well as lateral directions. A clitoral vibratory stimulator 66 may also extend from an upper rear portion of the device. It has a motor 65 and a rod 67, so that it is capable of the same motions as the penis part of the device. The motors of device 60 may be run at different speeds and intensities to produce different effects depending on the sense codes FIG. 4C shows a mechanical hand 70 that includes a receiver 52" that maybe wireless or wired to the converter. It includes motors 72 and rods 74 with articulated mechanical joints driven by the motors. The receiver 52" accepts sense signals from the converter 17 and causes the hand to move in accordance therewith. The text of the script may suggest that the hand be placed at various locations on the body.

To further bring into perspective a potential use of the of the devices 50, 60 and 70 within the framework of one of the processes of the present invention, two users may be sitting at distinct computers separated by a distance; but, connected through a network. One of the users can communicate his or her intentions to the other by typing text in his or her computer or unit using key words. The text will be routed to the intended recipient. While the recipient becomes immersed into the fantasy as a result of reading the text, text-based sense codes are generated and integrated with the embedded sense codes sent from the remote user. As a result, the recipient not only receives the fantasy text, but is physically stimulated in a manner consistent with the text. If the remote user is a physician, the text sent and the stimulation induced may be part of a therapeutic regimen for treating female sexual dysfunction and dissatisfaction.

Figure 5:
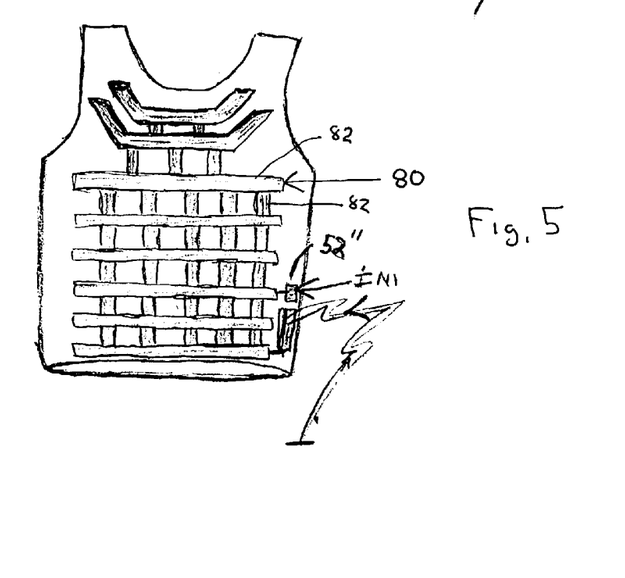
FIG. 5 is an illustration of a vest according to the present invention for therapeutic use on a patient by a chiropractor.

In FIG. 5, there is shown a therapeutic vest 80 which can be used as the physical device. The vest includes a receiver 52" which accepts the sense signals from the converter. In addition, the vest is equipped with a cross hash arrangement of vibrating strips 82, which may be inflation strips or electrical vibration strips. If they are inflation strips, a small pneumatic pump (not shown) is provided and is controlled by the sense signals received through receiver 52". In such a case, the strips may be inflated or deflated to produce particular tactile responses. If the strips are electrical vibrators, the vest can alternatively be vibrated at variable intensities to stimulate relaxation and massaging. Further, the vest can have a combination of inflation and electrical vibration strips for an unusual tactile experience.

The vest 80 (FIG. 5), can be used by an adult for resolving or alleviating back-problems. For example, a chiropractor could create an action script for alleviating a specific type of discomfort. The chiropractor would describe in typed text the hands-on procedure that should be used in administering the physical therapy. Next, this text description would be run under the invention-specific software to generate an action script. This action script would then be given (e.g., delivered through a network or through an action card) to the person experiencing the back discomfort. Wearing the invention-specific chiropractic vest, the patient would load the action card 38 containing the action script into the unit 30 of FIG. 2. Running the action script would drive the vest to apply the therapeutic behavior to the patient, which was intended by the chiropractor when the action script was created.

As with the devices of FIGS. 4A-4C, the vest 80 may be designed to offer real time interactive behavior. The user may communicate his or her problem to a remote chiropractor at a remote terminal. The chiropractor can enter text and/or sense codes at his terminal which, when received through the system of the present invention at the vest, will manipulate the chest and back of the patient in a manner designed by the chiropractor. As an alternative, the patient can enter text in natural language into the system, e.g., unit 30, thus initiating and maintaining the release of sense codes to drive the behavior of the vest in a manner that the patient believes will relieve his back pain.

A further example of application of the present invention is in the field of adult entertainment, where a sexual intention, sexual thought or sexual action may be expressed in text and converted to suitable sexual stimulation.

The attributes associated with a sense code usually are of the type of specific action (what is happening), and the quantity (how much, how fast is it happening). The relationship between text-with-sexual-connotations, the processing of such text, the resulting "sense codes" and what each code reveals, are set forth in the Table 1:

Preliminary Setup: Add a particular cologne to the scent reservoir in the device of FIG. 4A. Put on the vest 80 (FIG. 5) and hold the mechanical hand 70 (FIG. 4C). Further, stand near the device of FIG. 4A.

TABLE 1

| Processed Text | Resulting Sense Code | Sense Code Description | Implementation | Priority |
| --- | --- | --- | --- | --- |
| He approaches her on a wind- swept beach. | 20 | Fan on (medium intensity) | active + passive + verb | 12 |
|  | 22 | Liquid mist on (light) | embedded sense code |  |
| He embraced her slowly, hugging her tighter. | 80 | vest inflates slowly to a medium level. | active + verb | 6 |
| She could smell his cologne. | 24 | cologne scent is released by the scent spray. | passive + verb | 1 |
| She could feel his heart beating. | 81 | center strips of the vest expand and contract rhythmically. | active + passive | 6 |
| He released her from his embrace. | 82 | vest deflates. | active | 3 |
| Taking her hand, he gently squeezes it. | 72 | hand contracts gentle. | active + passive + verb | 1 |

The processed text shows the key words in bold. The sense codes are those associated with the key word. It is possible that more than one key word will have the same sense code, since there are many more words for sensations then can be implemented in the physical device. The Implementation indicates whether the key word signals active or passive content. For example, "she could feel his heart beating" indicates passive behavior on her part and active (heart beating) on his. The priority may be established as a way of indicating how close the key word is to the stimulation that can be created with the physical device that is available. The lower the number the more appropriate. For example, just because the beach is "wind swept" does not mean the wind is blowing now, so the priority is 12. The intention of an embrace is clear, but the inflation of the vest may not be a good representation, so a priority of 6 is given. However, where the text says she smelled his cologne and that odor is released, the intention is clear and the result is very close, so a priority of 1 is assigned. The priorities may be used to lower the intensity of one stimulation in favor or one with a higher priority, where both are indicated at the same time.

When creating a physical device, the manufacturer will use guidelines similar to the sense code/sense code description" listing above in order to create the product within suggested specifications. For example, the manufacturer will know that sense code 20 is described as "wind" at "medium"

intensity, with a suggested implementation of "Active+ Passive+Verb", at a suggested priority of "12". Based on this information, the manufacturer can implement a specific behavior for a specific sense code, while still able to be original and to exercise maximum creativity. As noted above, the action card of FIG. 2 can change the configuration of the converter. An example of the result of such a configuration change is that sense code 20 can represent wind under a "Romantic Configuration", while under an "Adult Sexual Configuration" the same code (20) can drive the device of FIG. 4B to work at its medium speed level.

Case Scenario 1:

Two distinct males and/or females are sitting at two distinct computers connected either through a LAN or a WAN or Internet. One or both of these clients have a system unit 30 connected to a physical device 18. Both of these clients have the software installed on their machines. Real time communication between these clients takes place through a third machine, e.g., a server. More specifically, one client types text on the keyboard 31 of his unit 30. That text is routed to the server (either specifically selected by the client or arbitrarily). Then the server forwards it to the intended recipient. When it reaches the recipient, the recipient's unit 30 processes it. Next, specific signals are generated from the processed text. These signals are routed to the physical stimulation device 18 that is connected to the recipient's computer or unit. The computer or unit interprets these signals and produces sense codes that cause and the physical device to react in specific ways.

The physical device is designed and intended to stimulate the obvious sexual organs in harmony with the image created by the mind as a result of reading the text appearing on the display screen 33 of recipient's unit 30. The recipient in turn may choose to respond to the initiator. If this happens, the recipient becomes the initiator, and the initiator becomes the recipient, and the same described process repeats.

Case Scenario 2:

One male or female sitting at a computer. The computer may or may not be connected to a LAN or a WAN or the Internet. If it is connected to one of those three, then it can be used for the purpose to download text content from other computers. If it is not connected to a network, then text content from a storage media, such as floppy disks or CD ROMs, can be loaded on the computer. Another way to generate text content is to have the user type the text directly. The text content downloaded from the network or the storage media or the user-typed text is loaded into the unit 30. The software of the system processes the text. Next, specific sense codes are generated from the processed text, which codes are passed to a physical device 18, triggering it to literally react specifically to the sense codes processed. The physical device is designed and intended to stimulate the obvious sexual organs in harmony with the image created by the mind as a result of reading the text.

Case Scenario 3 (Digital Video-Computer-Device):

One male or female sitting in front of a computer. The computer may or may not be connected to a LAN or a WAN or the Internet. If it is connected to one of those three, then it can be used for the purpose to download. Digital video content is delivered from other computers with sense codes integrated in the video content, or accompanied by a text file script (video content script) or an action card. If the computer is not connected to a network, then digital video content and the sense codes can be loaded on to the computer from storage media, or the video can be loaded in this way and the sense codes loaded from an action card. When the video is run in the recipient computer or unit, the video player will display the video and send the sense codes to the physical device to provide simultaneous sensory stimulation. If the action card is used, it can be read first and the reading of it can trigger the playing of the video. When a text file script is used, it is read by the system unit 30 or computer. The video can be run on the same device or on an unrelated video player, either together with or separate from the processing of the text script.

While the invention has been particularly shown and described with reference to preferred embodiments thereof, it will be understood by those skilled in the art that various changes in form and details may be made therein without departing from the spirit and scope of the invention.

I claim:

1. A system for physically stimulating the senses of a person according to a script, comprising:
    a database having entries that relate key words, indicating a physical sensation, to specific sense codes, said sense codes representing stimulation of one or more physical senses;
    an input for receiving text signals representing a script perceived in a predetermined sequential order;
    a comparator for comparing the text signals representing the script with the key word entries in the database, and generating at least one of the specific codes when there is a match; and
    a physical stimulation device driven in specific ways in response to the specific sense codes, each of said sense codes causing the device to stimulate at least one of sensations of sight, sound, feel, smell and taste in a user in proximity to the device, and in sequence with the text signals;
    further including an action card which changes the association between the sense codes and key words in said database.

2. The system as claimed in claim 1 further including a player, and wherein the text signals are stored on a storage medium, and the text signals are perceived by playing the storage medium in the player.

3. The system as claimed in claim 2 wherein said storage medium is one of a DVD, CD ROM and floppy disk; and said player is a personal computer with a drive for at least one of said media.

4. The system as claimed in claim 2 wherein said storage medium is a video tape; and said player is a personal computer controlling a video tape recorder.

5. The system as claimed in claim 1 further including a sound generator, wherein the received text signals further have accompanying sound information in a sequence determined by said text, said sound information begins converted to sound by the sound generator and being perceived by said user as said text is being read out.

6. The system as claimed in claims 1 or 5 further including a video display, wherein received text signals further have accompanying video information stored in a sequence determined by said text, said video information being converted in a video by said display and being perceived by said user.

7. The system as claimed in claim 1 wherein the text signals are received from a remote source.

8. The system as claimed in claim 7 wherein the text signals are received over the Internet from a remote computer.

9. The system as claimed in claim 1 wherein the physical stimulation device includes at least one of a liquid sprayer and a fan which stimulates the sense of touch of the user.

10. The system as claimed in claim 1 wherein the physical stimulation device includes a misting device for injecting an odor into the air in proximity to the user which stimulates the sense of smell of the user.

11. The system as claimed in claim 1 wherein the physical stimulation device includes, a vibrator and a chair for the user, wherein the vibrator moves the chair in response to codes signals.

12. The system as claimed in claim 1 wherein the physical stimulation device is a vest having at least one of vertical strips and horizontal strips, which produce a tactile response in the wearer.

13. The system as claimed in claim 12 wherein the strips may be vibrated.

14. The system as claimed in claim 12 wherein the strips may be inflated and deflated.

15. The system as claimed in claim 14 wherein the mechanical penis is capable of at least one of circular and lateral motion.

16. The system as claimed in claim 14 wherein the mechanical penis further includes a mechanical, motor driven clitoral stimulator projecting from an upper portion thereof.

17. The system as claimed in claim 1 wherein the physical stimulation device is a mechanical motor driven penis capable of back and forth motion.

18. The system as claimed in claim 1 wherein the physical stimulation device is a mechanical hand in which the fingers move separately or together in opening and closing the hand.

19. The system as claimed in claim 1 wherein the physical stimulation device is a bra, said bra having vibrators in the nipple area and in an under support area for each cup of the bra.

20. The system as claimed in claim 1 implemented in a computing device, wherein the database and input are parts of the computing device, the comparator is a software process run by the computing device, and the physical stimulation device is a separate unit driven by the output of the computing device.

21. The system as claimed in claim 20 wherein the computing device is a personal computer.

22. The system as claimed in claim 20 wherein the computing device is a special purpose device designed to implement the database, player and comparator functions.

* * * * *